United States Patent
Covington et al.

(10) Patent No.: US 9,260,185 B2
(45) Date of Patent: Feb. 16, 2016

(54) SYSTEM AND METHOD OF HARVESTING POWER WITH A ROTOR HUB DAMPER

(75) Inventors: Charles Eric Covington, Colleyville, TX (US); Mithat Yuce, Argyle, TX (US); David A. Popelka, Colleyville, TX (US); Frank B. Stamps, Colleyville, TX (US)

(73) Assignee: Textron Innovations Inc., Providence, RI (US)

( * ) Notice: Subject to any disclaimer, the term of this patent is extended or adjusted under 35 U.S.C. 154(b) by 774 days.

(21) Appl. No.: 13/358,046

(22) Filed: Jan. 25, 2012

(65) Prior Publication Data
US 2013/0189098 A1 Jul. 25, 2013

(51) Int. Cl.
*B64C 27/51* (2006.01)

(52) U.S. Cl.
CPC ...................... *B64C 27/51* (2013.01)

(58) Field of Classification Search
CPC .............................. B64C 27/51; F16F 15/03
USPC ................. 416/106, 107, 140, 141, 144, 145, 416/134 A; 188/267.1, 267.2, 267, 156, 188/158, 164; 267/140.1, 140.15, 136
See application file for complete search history.

(56) References Cited

U.S. PATENT DOCUMENTS

| | | | |
|---|---|---|---|
| 3,559,027 A | 1/1971 | Arsem | |
| 3,795,291 A * | 3/1974 | Naito et al. | 188/274 |
| 3,981,204 A | 9/1976 | Starbard | |
| 4,915,585 A * | 4/1990 | Guimbal | 416/140 |
| 5,449,152 A * | 9/1995 | Byrnes et al. | 267/153 |
| 5,573,088 A | 11/1996 | Daniels | |
| 5,775,469 A | 7/1998 | Kang | |
| 5,984,056 A * | 11/1999 | Agnihotri et al. | 188/267.2 |
| 6,920,951 B2 | 7/2005 | Song et al. | |
| 6,926,500 B2 | 8/2005 | Ferullo | |
| 6,952,060 B2 * | 10/2005 | Goldner et al. | 310/12.13 |
| 7,250,697 B2 | 7/2007 | Beaulieu | |
| 8,628,042 B2 * | 1/2014 | Imbert et al. | 244/134 D |
| 2003/0030523 A1 * | 2/2003 | Bell et al. | 335/220 |
| 2009/0218443 A1 | 9/2009 | Wereley et al. | |
| 2011/0155841 A1 | 6/2011 | Cranga et al. | |

FOREIGN PATENT DOCUMENTS

| | | |
|---|---|---|
| EP | 0853197 A1 | 7/1998 |
| EP | 1566563 A1 | 8/2005 |

OTHER PUBLICATIONS

"Introduction to Electric Circuits" by Dorf et al., published by John Wiley & Sons, Inc., 2010, p. 257.*
Extended European Search Report from related European Application No. 12157362, dated May 25, 2012, 6 pages.
(Continued)

*Primary Examiner* — Craig Kim
*Assistant Examiner* — Kayla McCaffrey
(74) *Attorney, Agent, or Firm* — James E. Walton

(57) ABSTRACT

The system and method of the present application relate to a lead/lag damper for a rotorcraft. The lead/lag damper is configured to harvest power from the lead/lag oscillatory motions of rotor blades with an electromagnetic linear motor/generator. Further, the lead/lag damper is configured to treat the lead/lag motions with the electromagnetic linear motor/generator. The system and method is well suited for use in the field of aircraft, in particular, helicopters and other rotary wing aircraft.

18 Claims, 6 Drawing Sheets

(56) References Cited

OTHER PUBLICATIONS

Search report dated May 22, 2014 from counterpart EP App. No. 14164955.8.
Office Action dated Jun. 16, 2014 from counterpart EP App. No. 14164955.8.
Search report dated Jul. 9, 2014 from counterpart CA App. No. 2,802,601.

"Electromagnetic Shock Absorbers", Northern Illinois University Mechanical Engineering Department, Dr. T.M. Mucahy et al; IMAC-XXI: Conference & Exposition on Structural Dynamics—Innovative Measurement Technologies, Feb. 2, 2011, 4 pages.
Office Action dated Feb. 27, 2015 from counterpart CA App. No. 2,802,601.

* cited by examiner

SYSTEM AND METHOD OF HARVESTING POWER WITH A ROTOR HUB DAMPER

BACKGROUND

1. Technical Field

The system and method of the present application relate to a damper for an aircraft. In particular, the system of the present application relates to a lead/lag damper for helicopters and other rotary wing aircraft.

2. Description of Related Art

Certain rotorcraft have multi-bladed rotor hub configurations that may require lead/lag dampers to treat forces associated with the oscillatory acceleration and deceleration of each rotor blade during operation. During forward flight of the rotorcraft, unequal drag forces on the advancing and retreating rotor blade positions typically cause oscillating forces that if left untreated, negatively affect the rotorcraft. For example, untreated lead/lag oscillating forces can severely limit the life of structural components through fatigue. Furthermore, untreated lead/lag oscillating forces have even been known to cause catastrophic results in a "ground resonance" phenomenon, in which the oscillation frequency is similar to the resonant frequency of the aircraft while resting on its landing gear. There can be other unequal forces in the rotor system, such as those that arise from rotor blade flapping motions.

Certain rotorcraft may require electrical energy to power one or more electrical subsystems located on the rotor blades and/or rotating portion of the rotor system. Typically, the electrical energy is generated by a generator positioned near the rotorcraft engine, which can create technical issues when channeling the electrical energy to one or more electrical subsystems located on rotating components of the rotor system. Conventionally, a slip ring and/or other suitable devices are used when transferring the electrical energy from the non-rotating components to the rotating components on the rotor hub. However, slip ring devices are typically heavy and unreliable, which can negatively affect the efficiency of the rotorcraft.

Although the foregoing developments represent strides in the area of rotorcraft systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

DESCRIPTION OF THE PREFERRED EMBODIMENT

Illustrative embodiments of the system and method of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The system and method of the present application relate to a lead/lag damper for an aircraft, such as a rotorcraft. Further, the lead/lag damper is configured to harvest power from the lead/lag oscillatory motions of rotor blades with an electromagnetic linear motor/generator. Even further, the lead/lag damper is configured to treat the lead/lag motions with the electromagnetic linear motor/generator. The system and method of the present application is well suited for use in the field of aircraft, in particular, helicopters and other rotary wing aircraft.

Figure 1:
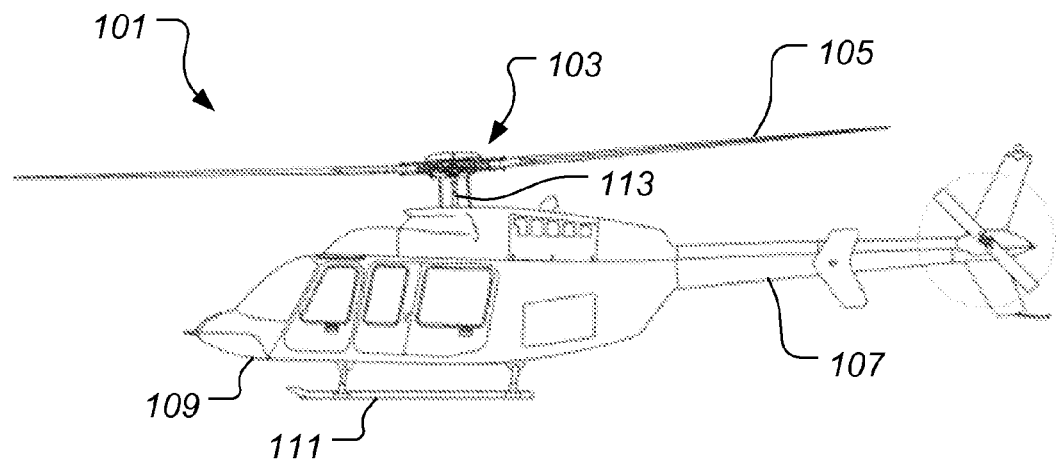
FIG. 1 is a side view of a rotorcraft, according to an embodiment of the present application.

Referring to FIG. 1 in the drawings, a rotorcraft 101 according to the present application is illustrated. Rotorcraft 101 has a fuselage 109, a main rotor mast 113, and a main rotor assembly 103 having main rotor blades 105. Rotorcraft 101 has a tail member 107 and a landing gear 111. Main rotor blades 105 generally rotate about an axis defined by main rotor mast 113. It should be appreciated that the system and method of the present application may also be utilized on other types of rotary wing aircraft.

Figure 2:
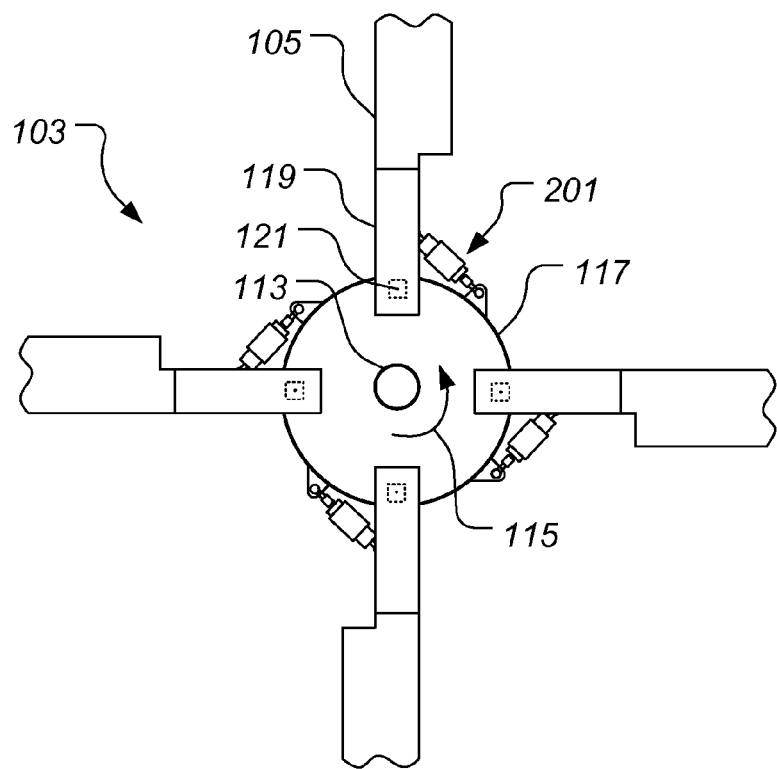
FIG. 2 is a top schematic view of a rotor hub, according to an embodiment of the present application.

Referring now also to FIG. 2, main rotor assembly 103 includes a plurality of rotor blades 105 coupled to a central yoke 117, via a rotor grip 119. Yoke 117 is coupled to rotor mast 113 such that rotation of rotor mast 113, in a direction 115, causes the yoke 117 and rotor blades 105 to rotate about the rotor mast axis of rotation. The pitch of each rotor blade 105 is selectively controlled in order to selectively control direction, thrust, and lift of rotorcraft 101. Each rotor blade 105 is preferably hinged about a hinge axis 121. Hinge axis 121 can be the result of a discreet hinge, or alternatively from a virtual hinge, or combination of discreet hinges and/or virtual hinges. A lead/lag damper 201 is coupled between each rotor blade 105 and the rotor yoke 117. Lead/lag damper 201 is configured to harvest energy as well as treat lead/lag oscillations during operation of the rotorcraft, as further described herein. It should be appreciated that the even though main rotor assembly 103 is illustrated with four rotor blades 105, the system and method of the present application is equally applicable to rotor systems having an alternative number of rotor blades 105.

Figure 3:
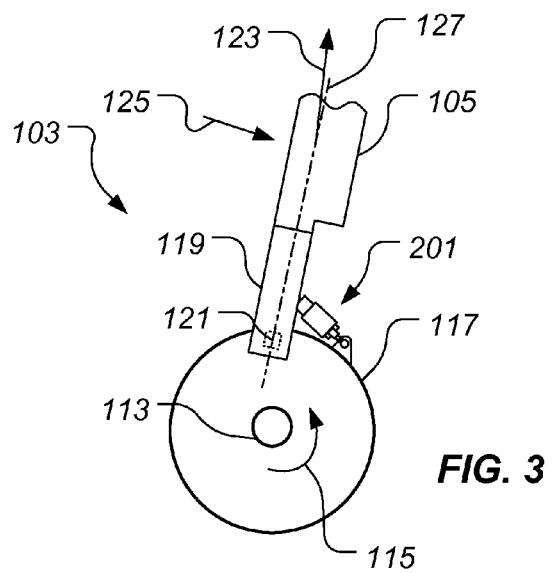
FIG. 3 is a top schematic view of a rotor hub, according to an embodiment of the present application.

Referring now to FIG. 3, main rotor system 103 is further illustrated. For clarity, only a single rotor blade 105 is shown; however, it should be appreciated that the discussion regarding the rotor blade 105 is equally applicable to other rotor blades 105 that are not shown for clarity. During operation of rotorcraft 101, main rotor system 103 is subjected to a variety of aerodynamic forces, as well as mechanical dynamic forces. Main rotor system 103 rotates around the rotor mast axis at approximately 300-350 revolutions per minute (RPM). However, it should appreciated that the rate of rotation of main rotor system 103 is implementation specific; accordingly, the present application contemplates rotor hubs that rotate at other RPM's as well.

A centrifugal force 123 acts upon rotor blade 105 when rotor blade 105 is rotating around the rotor mast axis. Further, an aerodynamic drag force 125 imparts a restraining force upon the rotor blade 105. The centrifugal force 123 and aerodynamic drag force 125 create moments that act upon rotor blade 105. When the moments from the centrifugal force 123 and aerodynamic drag force 125 are balanced, then the rotor blade 105 is an equilibrium position, such as equilibrium position 127.

Figure 4A:
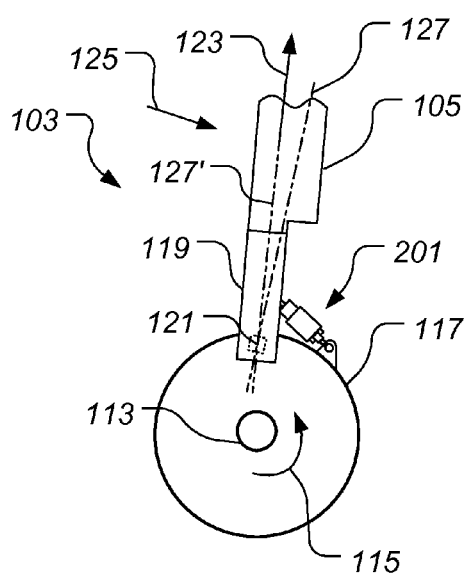
FIGS. 4A and 4B are top schematic views of a rotor hub, according to an embodiment of the present application.
Figure 4B:
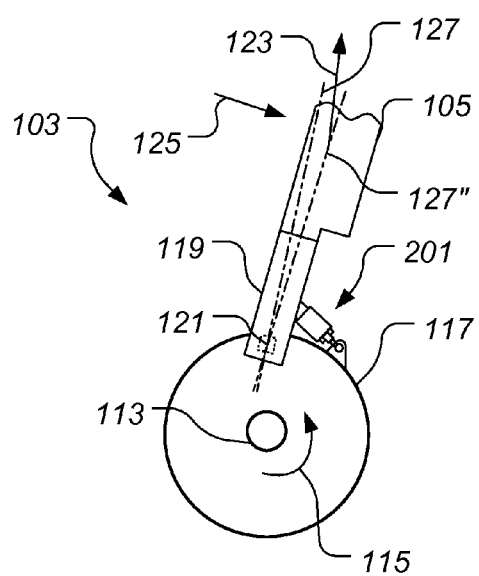

Referring to FIG. 4A, rotor blade 105 is shown in a lead position 127' in which the position of rotor blade 103 has deviated forward from equilibrium position 127. Referring also to FIG. 4B, rotor blade 103 is shown in a lag position 127" in which the position of rotor blade 103 has deviated aft of equilibrium position 127. These illustrative deviations can be the result of a lead/lag oscillatory force acting upon rotor blade 105. The deviation of rotor blade 105 into lead position 127', or lag position 127", can be the result of a lead/lag force that imparts a once per revolution (1/rev) oscillatory force facilitating the temporary positioning of rotor blade 105 in lead position 127' or lag position 127". When airflow resulting from a translation of the rotorcraft, or a wind gust, aligns with a directional position of rotor blade 105, then the temporary decrease in drag acts to accelerate the rotor blade 105 during that rotational phase of the rotor blade 105, resulting in the temporary lead position 127'. In contrast, when the translation airflow direction opposes the directional position of rotor blade 105, then the temporary increase in drag acts to decelerate the rotor blade 105 during that rotational phase of the rotor blade 105, resulting in the temporary lag position 127". These lead/lag forces act to accelerate and decelerate each rotor blade 105 within a single revolution (1/rev) about the rotor mast 113.

Figure 5:
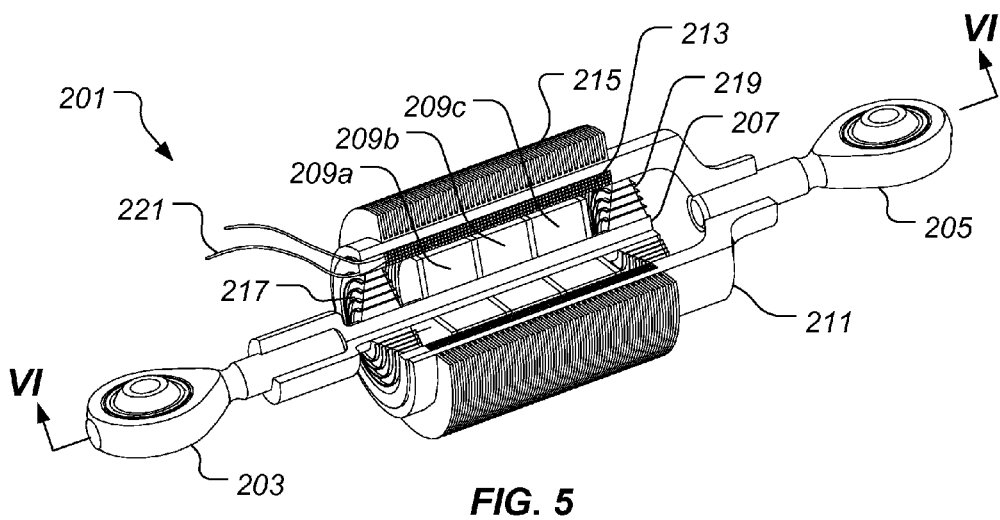
FIG. 5 is a perspective view of a lead/lag damper, according to the preferred embodiment of the present application.
Figure 6:
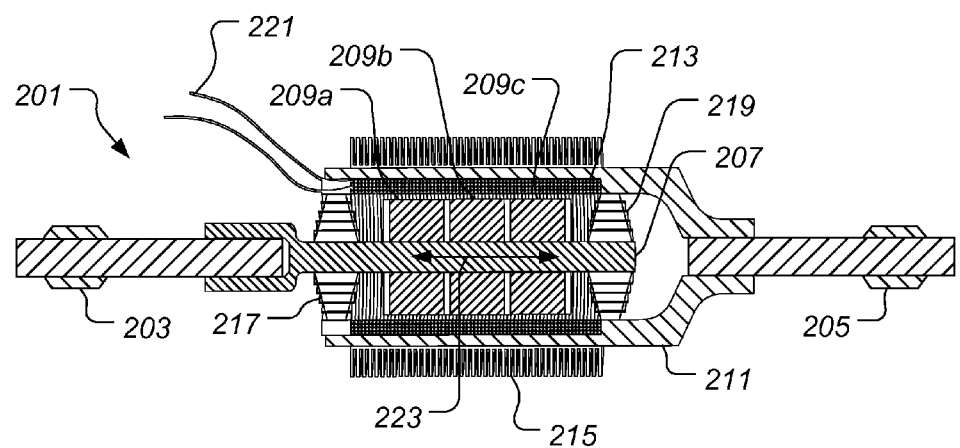
FIG. 6 is a cross-sectional view of the lead/lag damper, taken from section lines VI-VI in FIG. 5, according to the preferred embodiment of the present application.

Referring now to FIG. 5, a lead/lag damper 201, according to the preferred embodiment is illustrated. Lead/lag damper 201 includes a first connection member 203 coupled to a shaft 207. A plurality of magnets, such as magnets 209a-209c, are attached circumferentially around shaft 207 such that an axial translation of shaft 207 also results in a translation of magnets 209a-209c. Lead/lag damper 201 further includes a second connection member 205 coupled to a housing 211. In the preferred embodiment, first and second connection members 203 and 205 are each a rod end with a spherical bearing located therein. However, it should be appreciated that first and second connection members 203 and 205 may be of any configuration capable of providing a structural connection between rotor blade 105 and central yoke 117.

Housing 211 is preferably cylindrically shaped with a conductive member 213 associated with an interior portion of housing 211. Conductive member 213 is a winding of a conductive wire, such as a copper wire, to form a solenoid. It should be appreciated that even though conductive member 213 is illustrated and describing as an actual winding of conductive wire, conductive member 213 can alternatively be any conductive specimen that allows currents to be generated. For example, conductive member 213 can be a plurality of disk members. A heat sink 215 is in thermal connection to an outer portion of housing 211. Shaft 207 is resiliently coupled to housing 211 with a first elastomeric bearing 217 and a second elastomeric bearing 219. In the preferred embodiment, first elastomeric bearing 217 and second elastomeric bearing 219 are each adhesively bonded to shaft 207 and housing 211. First elastomeric bearing 217 and second elastomeric bearing 219 each preferably include a laminate of alternating layers of resilient cylindrical elastomeric members separated by rigid cylindrical shim layers. First elastomeric bearing 217 and second elastomeric bearing 219 each deform when subjected to a shear force, thereby providing damping to the lead/lag motion of rotor blade 105, as discussed further herein. It should be appreciated that first elastomeric bearing 217 and second elastomeric bearing 219 may have a wide variety of implementation specific configurations for tailoring of stiffness and damping characteristics. Further, the requisite size of first elastomeric bearing 217 and second elastomeric bearing 219 is implementation specific and depends in part on the predicted rotor hub and blade loads. The geometry and composition of first elastomeric bearing 217 and second elastomeric bearing 219 may be configured to provide linear or non-linear strain properties.

One of the first connection member 203 and second connection member 205 is coupled to the central yoke 117, while the other of the first connection member 203 and second connection member 205 is coupled to the rotor grip 119 of rotor blade 105. It should be appreciated that lead/lag damper 201 may be associated with the main rotor assembly 103 in a variety of configurations. For example, lead/lag damper 201 may alternatively be coupled between adjacent rotor blades 105, instead of being coupled between the rotor blade 105 and central yoke 117.

During operation, lead/lag damper 201 is configured to harvest energy as well as treat lead/lag oscillations during operation of rotorcraft 101. Electrical energy is created by the lead/lag forces effecting an oscillatory translation, in a direction 223, of magnets 209a-209c relative to conductive member 213. The oscillatory translation of magnets 209a-209c through the interior of conductive member 213 creates an alternating current in conductive member 213 by induction. Leads 221 are electrically coupled between conductive member 213 and a circuitry of a system 701 (shown in FIG. 7). Any residual heat created in the inductive generating of electrical energy can be dissipated into the ambient atmosphere by heat sink 215. In the preferred embodiment, system 701 includes an energy storage device, such as a battery or capacitor. Furthermore, the electrical energy created by lead/lag damper 201 can be used to power systems on the rotating portion of main rotor assembly 103. Exemplary systems can include rotor blade de-icing systems, diagnostic systems, actuated rotor blade flaps, and rotor blade lights, to name a few.

Lead/lag damper 201 is configured to treat lead/lag oscillations in a variety of measures. Firstly, first elastomeric bearing 217 and second elastomeric bearing 219 each deform when subjected to a shear force through translation in direction 223, thereby providing damping to the lead/lag motion of rotor blade 105. Secondly, the resistance in the translation of magnets 209a-209c relative to conductive member 213 provides damping of the lead/lag oscillatory motions. It should be appreciated that the resistive damping can be actively and/or passively varied in order to optimize the amount of resistive damping, as discussed further in regard to FIG. 7. Thirdly, a capacitor, an inductor, or other energy releasing device, can be controllably used to impart a desired force reaction between magnets 209a-209c relative to conductive member 213, thereby treating the lead/lag motions of rotor blade 105, as discussed further in regard to FIG. 7.

Figure 7:
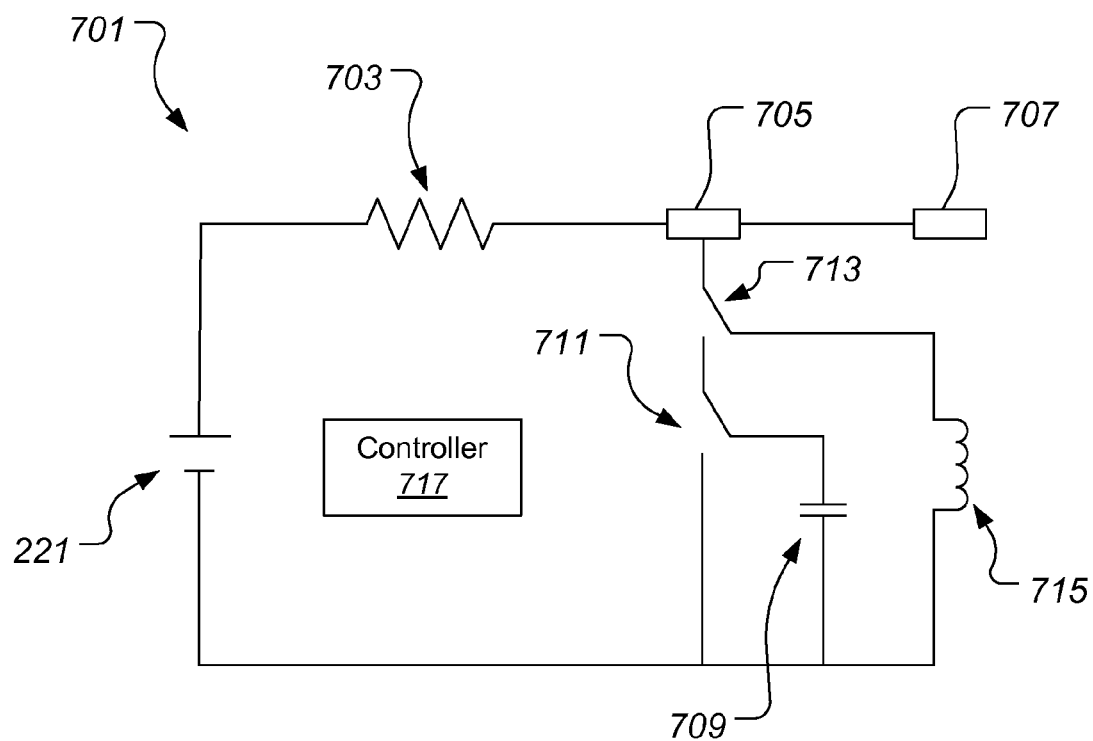
FIG. 7 is a schematic diagram of a system, according to an embodiment of the present application.

Referring to FIG. 7, an exemplary system 701 and circuitry coupled to leads 221, is schematically illustrated. System 701 can include a resistor 703, a battery 705, a switch 711, a capacitor 709, a switch 713, and an inductor 715. Resistor 703 is illustrative of a wide variety of resistive configurations that can be used to selectively vary the resistance in the translation of magnets 209a-209c relative to conductive member 213, thereby providing variability in the damping effect upon the lead/lag motions of rotor blade 105. Resistor 703 can be a plurality of resistors and switches, the switches being controlled by a controller 717. In another embodiment, resistor 703 is in a duty cycle configuration such that the resistor is rapidly switched on/off to efficiently and selectively provide damping effect upon the lead/lag motion of rotor blade 105. Further, capacitor 709 can be selectively charged and released so as to generate a force reaction between magnets 209a-209c and conductive member 213, the force reaction being synchronized to push against the lead/lag movement. In such an embodiment, the electric energy generated by the translation of magnets 209a-209c relative to conductive member 213 is stored and released by capacitor 709, so as to further treat the lead/motion. Similarly, an inductor 715 can be selectively used to store and release energy to generate a force reaction between magnets 209a-209c and conductive member 213, the force reaction being synchronized to pull against the lead/lag movement.

Still referring to FIG. 7, a battery 705 can be used to store electrical energy. A power consuming system 707 is illustrative of a power system on the rotating portion of main rotor assembly 103. It should be appreciated that system 701 can include other system and circuit related components configured to further tailor the functionality of lead/lag damper 201.

Figure 8:
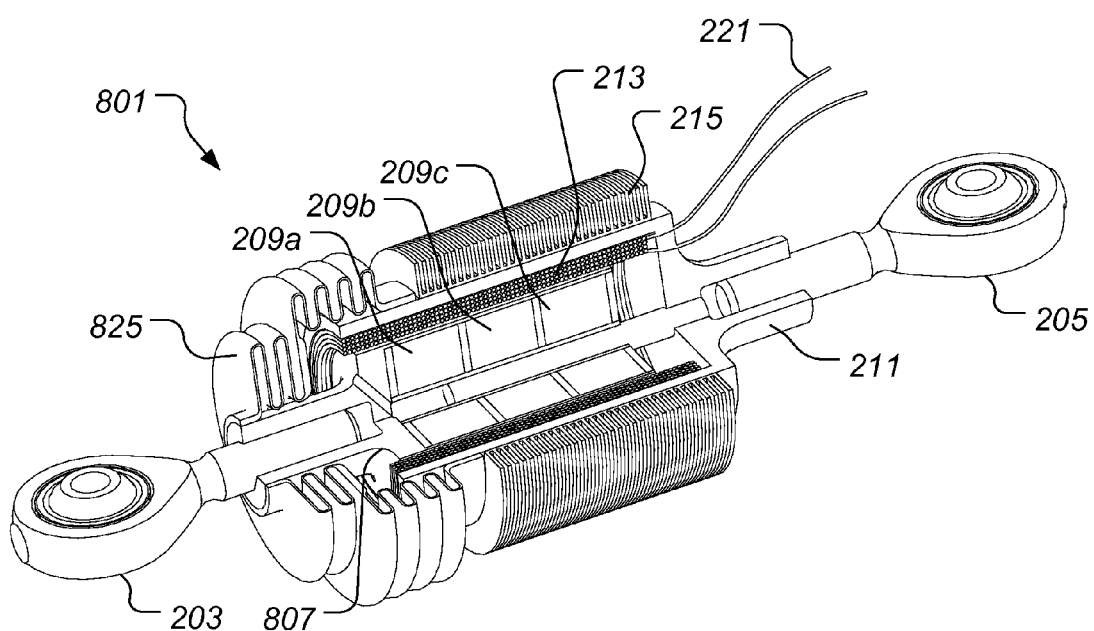
FIG. 8 is a perspective view of a lead/lag damper, according to an alternative embodiment of the present application.

Referring now also to FIG. 8, an alternative embodiment lead/lag damper 801 is illustrated. Lead/lag damper 801 is substantially similar to lead/lag damper 201, except for the differences noted herein. A housing 807 is used in lieu of shaft 207. Housing 807 is a cylindrical member that contains magnets 209a-209c, the magnets 209a-209c being located on an interior portion of housing 807. Further, lead/lag damper 801 includes a flexible boot 825 configured to protect otherwise exposed elements of lead/lag damper 801.

Figure 9:
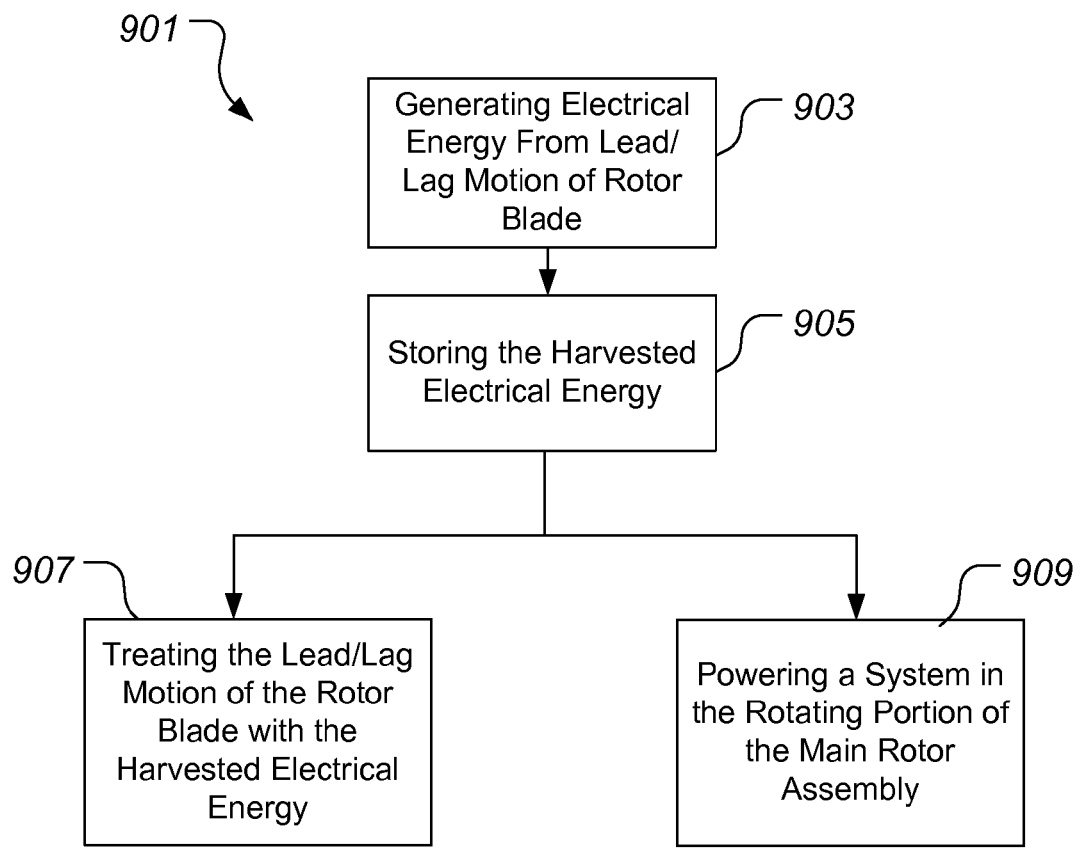
FIG. 9 is a method of using a lead/lag damper in a rotorcraft according to an embodiment of the present application.

Referring now to FIG. 9, a method 901 for using lead/lag dampers 201 and 801, as well as system 701, in rotorcraft 101 is illustrated. Method 901 includes a step 903 of generating electrical energy from lead/lag motion of rotor blade 105. As further described herein, the lead/lag motion causes a translation of magnets 209a-209c relative to conductive member 213, thereby creating electrical energy. Method 901 further includes a step 905 of storing the electrical energy harvested in step 903. As further described herein, battery 805, capacitor 709, and inductor 715 are illustrative components that can be used for storing the electrical energy. A step 907 includes treating the lead/lag motion of the rotor blade with the harvested electrical energy stored in step 905. As further described herein, system 701 includes circuitry for selectively generating resistance and inertial forces between magnets 209a-209c relative to conductive member 213 for treating the lead/lag motions. Step 907 can include can include changing the damping characteristics during operation of rotorcraft 101. For example, system 701 can be used to increase damping in lead/lag damper 201 during startup and shutdown periods to avoid ground resonance issues. System 701 can then be used to decrease damping in lead/lag damper 201 during normal flight operation to reduce performance losses in main rotor assembly 103. Further, system 701 can be controlled to selectively vary the treatment of lead/lag motions in accordance with varying rotor RPM's. Similarly, system 701 can be controlled to selectively vary the treatment of lead/lag motions in accordance with varying ambient conditions, such as temperature or altitude, for example. A step 909 includes powering a system in the rotating portion of main rotor assembly 103. As further described herein, exemplary power consuming systems can include rotor blade de-icing systems, actuated rotor blade flaps, and rotor blade lights, to name a few.

It should be appreciated that any of the components of system 701 may be redundant of other components in order to improve reliability and/or fault tolerance.

The system and method of the present application provide significant advantages, including: (1) providing lead/lag damper that is configured to generate electrical power from the lead/lag motions of the rotor blade; (2) generating the electrical power in the rotating part of the main rotor system so to alleviate electrical power requirements that would otherwise need to be communicated from the non-rotating part of the rotorcraft; and (3) providing a lead/lag damper with a electromagnetic linear motor/generator that is configured to not only generate power, but also impart resistance for damping, as well as impart forces (such as spring-like forces), for treating the lead/lag motions.

The particular embodiments disclosed above are illustrative only, as the application may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the application. Accordingly, the protection sought herein is as set forth in the claims below. It is apparent that a system with significant advantages has been described and illustrated. Although the system of the present application is shown in a limited number of forms, it is not limited to just these forms, but is amenable to various changes and modifications without departing from the spirit thereof.

The invention claimed is:

1. A lead/lag damper for an aircraft, comprising:
a first connection member; a second connection member;
a plurality of magnets rigidly associated with the first connection member; an electrically conductive member rigidly associated with the second connection member, the electrically conductive member being located approximate to the plurality of magnets;
a shaft coupled between the first connection member and the plurality of magnets; a housing coupled between the second connection member and the electrically conductive member;
a heat sink located approximate to the electrically conductive member on an exterior of the housing and in thermal communication with the housing; and
a power storage device configured to release stored electrical energy to generate a force between the plurality of magnets and the electrically conductive member, the force being tailored to treat the lead/lag motion during operation of the aircraft;

wherein the power storage device is configured to release the stored electrical energy to a power consuming system associated with a rotor system;
wherein the lead/lag damper is configured such that a lead/lag force causes a translation of the plurality of magnets relative to the electrically conductive member, thereby generating electrical energy.

2. The lead/lag damper according to claim 1, further comprising:
a first elastomeric bearing attached between the housing and the shaft, the first elastomeric bearing being configured to provide damping when the lead/lag damper is subjected to the lead/lag force.

3. The lead/lag damper according to claim 2, further comprising:
a second elastomeric bearing attached between the housing and the shaft, the second elastomeric bearing being configured to provide damping when the lead/lag damper is subjected to the lead/lag force.

4. The lead/lag damper according to claim 1, further comprising:
a circuit coupled to the electrically conductive member.

5. The lead/lag damper according to claim 1, further comprising:
a resistance in a translation of the plurality of magnets relative to the electrically conductive member, the resistance being configured to provide damping to the lead/lag motion.

6. The lead/lag damper according to claim 5, wherein the resistance is variable so that the damping to the lead/lag motion can be selectively varied during operation of the aircraft.

7. The lead/lag damper according to claim 1, wherein the power consuming system is at least one of: a rotor blade de-icing system; an actuated rotor blade flap; and a rotor blade light.

8. The lead/lag damper according to claim 1, wherein the electrically conductive member is a coil winding.

9. The lead/lag damper according to claim 1, wherein the electrically conductive member is a plurality of disk members.

10. A system or a rotor hub assembly, the system comprising:
a lead/lag damper having an electromagnetic linear motor and an external heat sink, the electromagnetic linear motor being configured to generate electrical power when subjected to a lead/lag force;
an energy storage device electrically coupled to the electromagnetic linear motor; and a controller associated with a circuitry for selectively changing a resistance between translating components in the electromagnetic linear motor;
wherein the controller is configured to release electrical energy stored by the energy storage device to the electromagnetic linear motor so as to treat the lead/lag force;
wherein the energy storage device is configured to release the stored electrical energy to a power consuming with a rotor system.

11. The system according to claim 10, wherein the circuitry includes a resistor.

12. The system according to claim 10, wherein the energy storage device is a battery.

13. The system according to claim 10, wherein the energy storage device is a capacitor.

14. The system according to claim 10, wherein the energy storage device is an inductor.

15. A method of using a lead/lag damper in an aircraft, the method comprising:
generating an electrical energy by converting a mechanical lead/lag motion to the electrical energy with an electromagnetic linear motor in the lead/lag damper;
storing the electrical energy generated by the electromagnetic linear motor;
powering a system in a rotating portion of a rotor assembly with the stored electrical energy;
treating the mechanical lead/lag motion by using the stored electrical energy to generate a reactive force in the electromagnetic linear motor; and
dissipating heat produced by the lead/lag damper through an external heat sink.

16. The method according to claim 15, wherein the step of treating the mechanical lead/lag motion further comprises varying the reactive force as a rate of revolution of the rotating portion varies.

17. The method according to claim 15, wherein the step of treating the mechanical lead/lag motion further comprises varying the reactive force as an ambient condition varies.

18. The method according to claim 17, wherein the ambient condition is at least one of:
an ambient temperature; and
an ambient altitude.

* * * * *